US012023528B2

(12) United States Patent
Sweezy

(10) Patent No.: US 12,023,528 B2
(45) Date of Patent: Jul. 2, 2024

(54) HAND HELD FACEMASK ASSEMBLY

(71) Applicant: Miranda Sweezy, Minneapolis, MN (US)

(72) Inventor: Miranda Sweezy, Minneapolis, MN (US)

( * ) Notice: Subject to any disclaimer, the term of this patent is extended or adjusted under 35 U.S.C. 154(b) by 883 days.

(21) Appl. No.: 17/108,305

(22) Filed: Dec. 1, 2020

(65) Prior Publication Data

US 2022/0168598 A1 Jun. 2, 2022

(51) Int. Cl.
*A62B 23/02* (2006.01)
*A41D 13/11* (2006.01)
*A62B 25/00* (2006.01)

(52) U.S. Cl.
CPC ............ *A62B 23/025* (2013.01); *A41D 13/11* (2013.01); *A62B 25/00* (2013.01)

(58) Field of Classification Search
CPC ................ A41D 13/11; A41D 13/1153; A41D 13/1184; A41D 27/28; A41D 31/14; A45D 40/30; A45D 42/02; A45D 44/12; A61F 2006/041; A61F 2006/042; A61F 6/04; A61F 9/022; A61F 9/029; A61F 9/06; A61F 9/065; A61L 2209/14; A61L 9/16; A61L 9/20; A62B 23/025; A62B 25/00; A62B 99/00; A63F 2003/00583; A63F 2003/0492; A63F 2009/0064; A63F 2250/485; A63F 3/0478; Y10S 128/909
See application file for complete search history.

(56) References Cited

U.S. PATENT DOCUMENTS 918,593 A * 4/1909 Price ...................... A45D 42/02 132/316
3,488,772 A 1/1970 Sturm
3,552,392 A * 1/1971 Dounoucos ............ B64D 13/02 128/205.12
3,740,768 A 6/1973 McCosker
3,908,648 A * 9/1975 McCosker ............. A45D 44/12 2/9
4,038,979 A 8/1977 McCosker
4,837,861 A 6/1989 Cole
5,822,801 A 10/1998 Varney
5,865,196 A * 2/1999 Foote ..................... A45D 44/12 132/285
6,842,909 B2 1/2005 Ostrov
8,122,886 B2 * 2/2012 Kwok .................... A62B 18/10 128/205.25
2004/0194191 A1 * 10/2004 Ostrov .................. A41D 13/11 2/9

FOREIGN PATENT DOCUMENTS

CN 108969191 A * 12/2018

* cited by examiner

*Primary Examiner* — Annette Dixon

(57) ABSTRACT

A hand held facemask assembly includes a handle that can be gripped by a user. A panel is coupled to the handle such that the panel can be positioned in front of the user's face. The panel has a pair of air holes each extending therethrough to pass air therethrough thereby facilitating the user to breathe through the air holes. A filter is coupled to the panel and the filter is comprised of an air permeable material to facilitate the user to breathe through the filter. Moreover, the filter is comprised of a bacterial blocking material to inhibit bacteria from passing therethrough. In this way the filter inhibits airborne transmission of infectious diseases between the user and an individual that is positioned proximate the user.

8 Claims, 6 Drawing Sheets

HAND HELD FACEMASK ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to facemask devices and more particularly pertains to a new facemask device for inhibiting the airborne transmission of infectious diseases. Additionally, the facemask device is hand held, rather than being worn on a user's face.

(2) Description of Related Art Including Information Disclosed Under 37 CFR 1.97 and 1.98

The prior art relates to facemask devices including a conical shield for positioning against a user's face while applying hair spray. The prior art discloses a frame and a tongue coupled to the frame for holding a paper filter in the frame thereby defining a face mask. The prior art discloses a variety of hand held masks for positioning against a user's face while applying hair spray.

BRIEF SUMMARY OF THE INVENTION

An embodiment of the disclosure meets the needs presented above by generally comprising a handle that can be gripped by a user. A panel is coupled to the handle such that the panel can be positioned in front of the user's face. The panel has a pair of air holes each extending therethrough to pass air therethrough thereby facilitating the user to breathe through the air holes. A filter is coupled to the panel and the filter is comprised of an air permeable material to facilitate the user to breathe through the filter. Moreover, the filter is comprised of a bacterial blocking material to inhibit bacteria from passing therethrough. In this way the filter inhibits airborne transmission of infectious diseases between the user and an individual that is positioned proximate the user.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
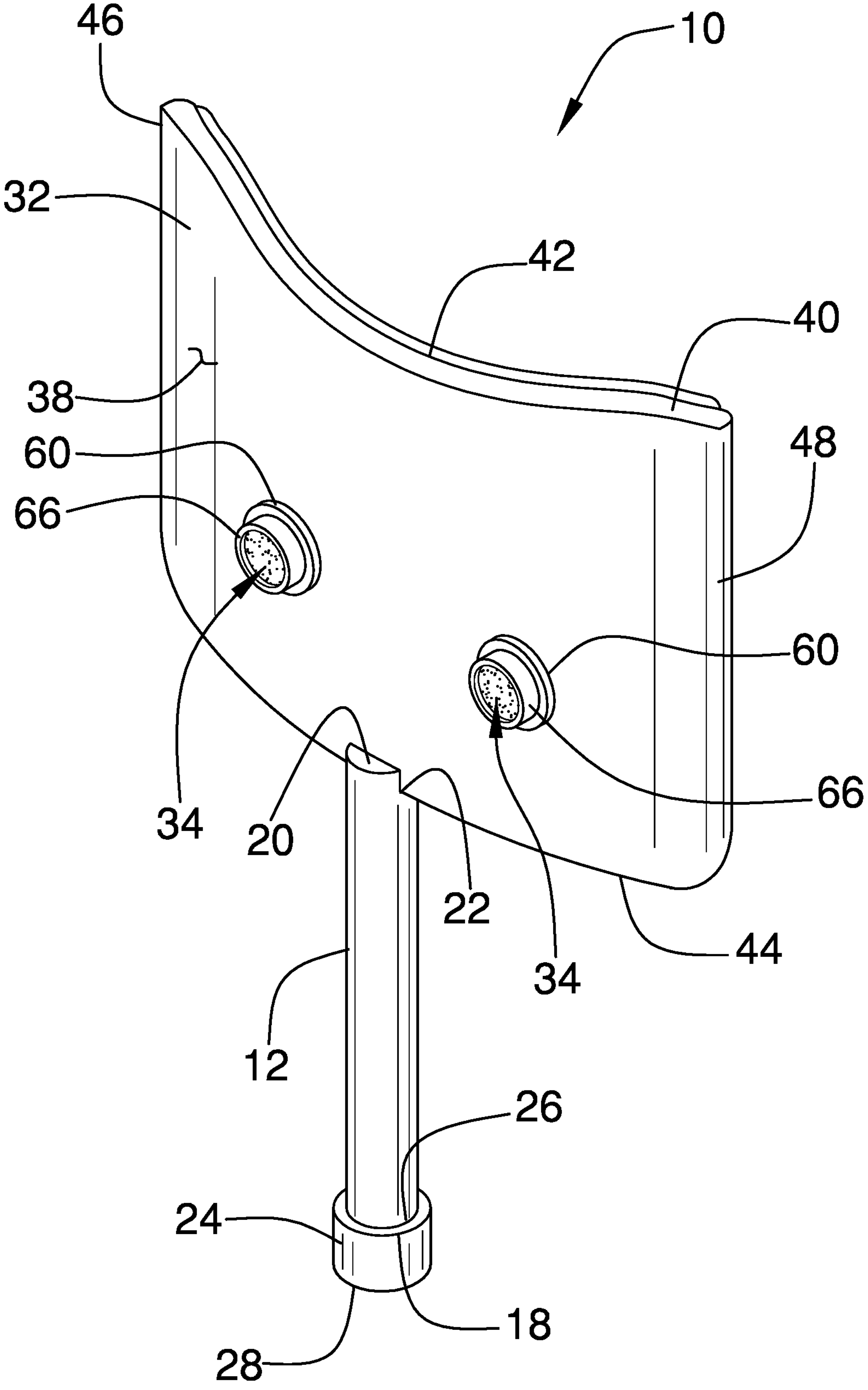
FIG. 1 is a front view of a hand held facemask assembly according to an embodiment of the disclosure.
Figure 2:
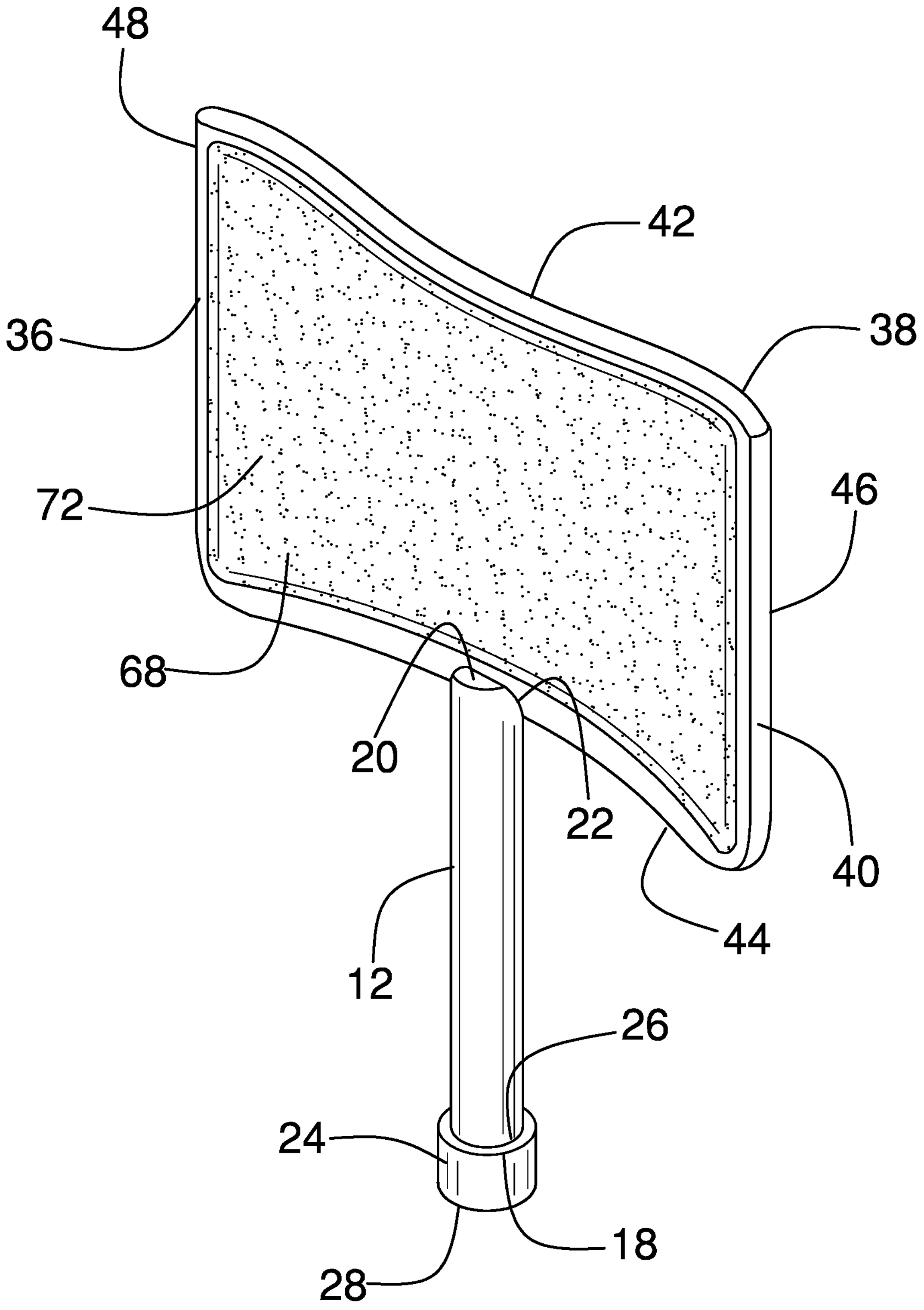
FIG. 2 is a back perspective view of an embodiment of the disclosure.
Figure 3:
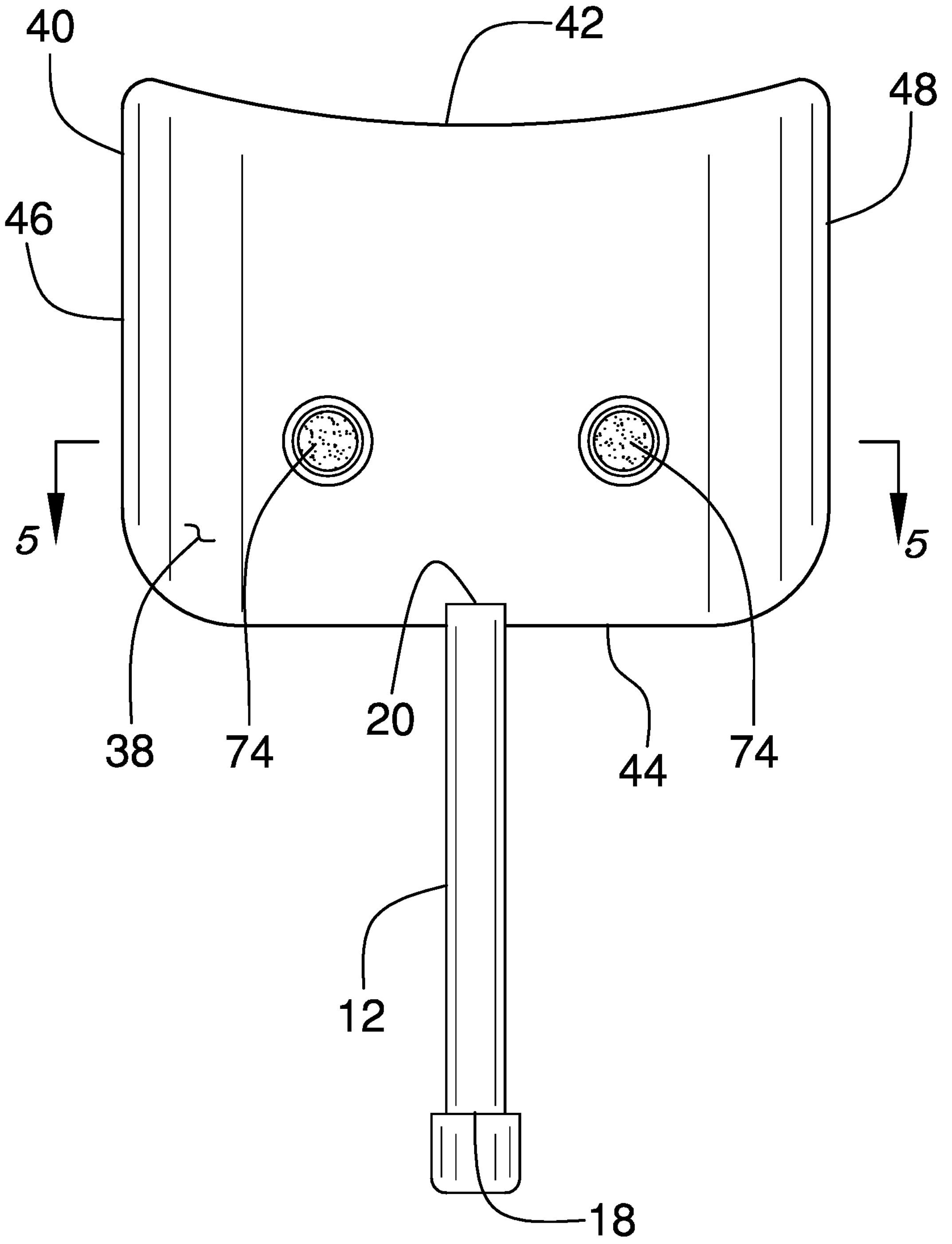
FIG. 3 is a front view of an embodiment of the disclosure.
Figure 4:
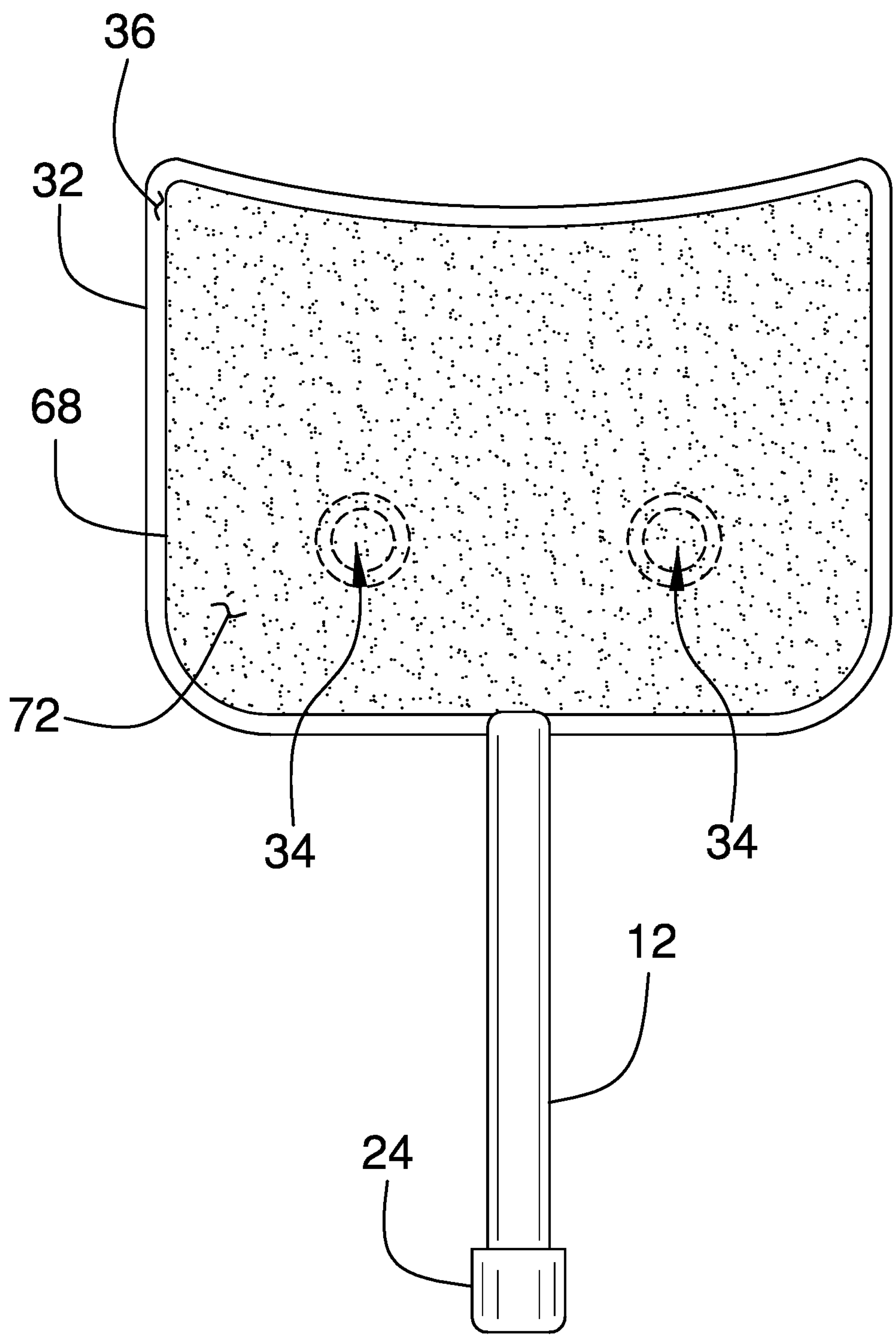
FIG. 4 is a back phantom view of an embodiment of the disclosure.
Figure 5:
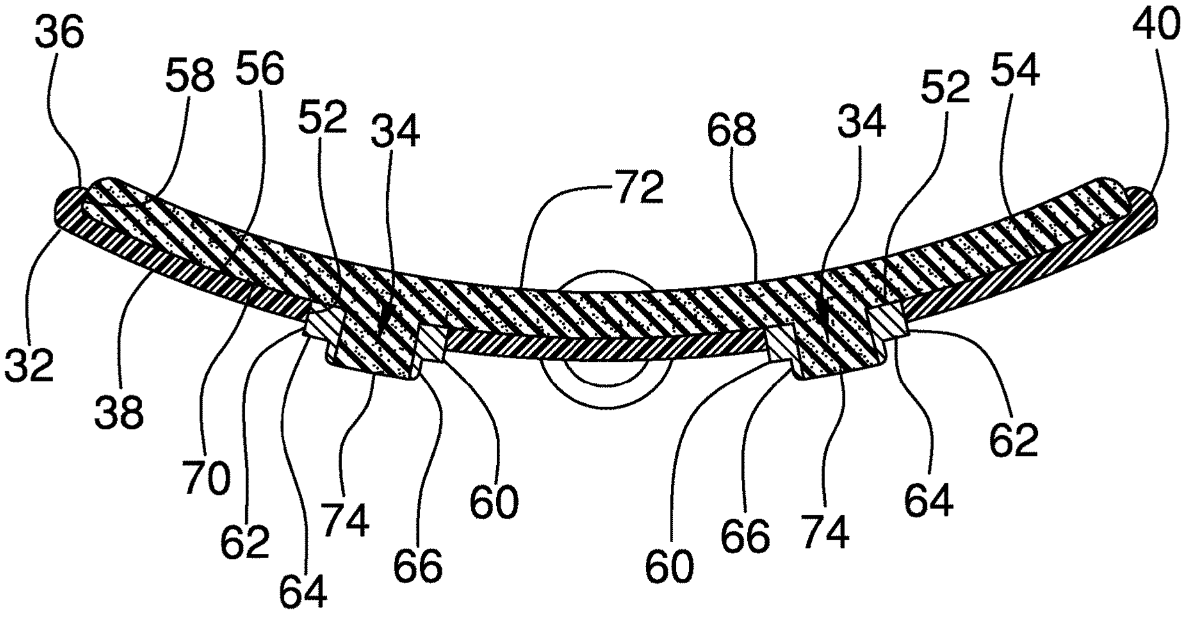
FIG. 5 is a cross sectional view taken along line 5-5 of FIG. 3 of an embodiment of the disclosure.
Figure 6:
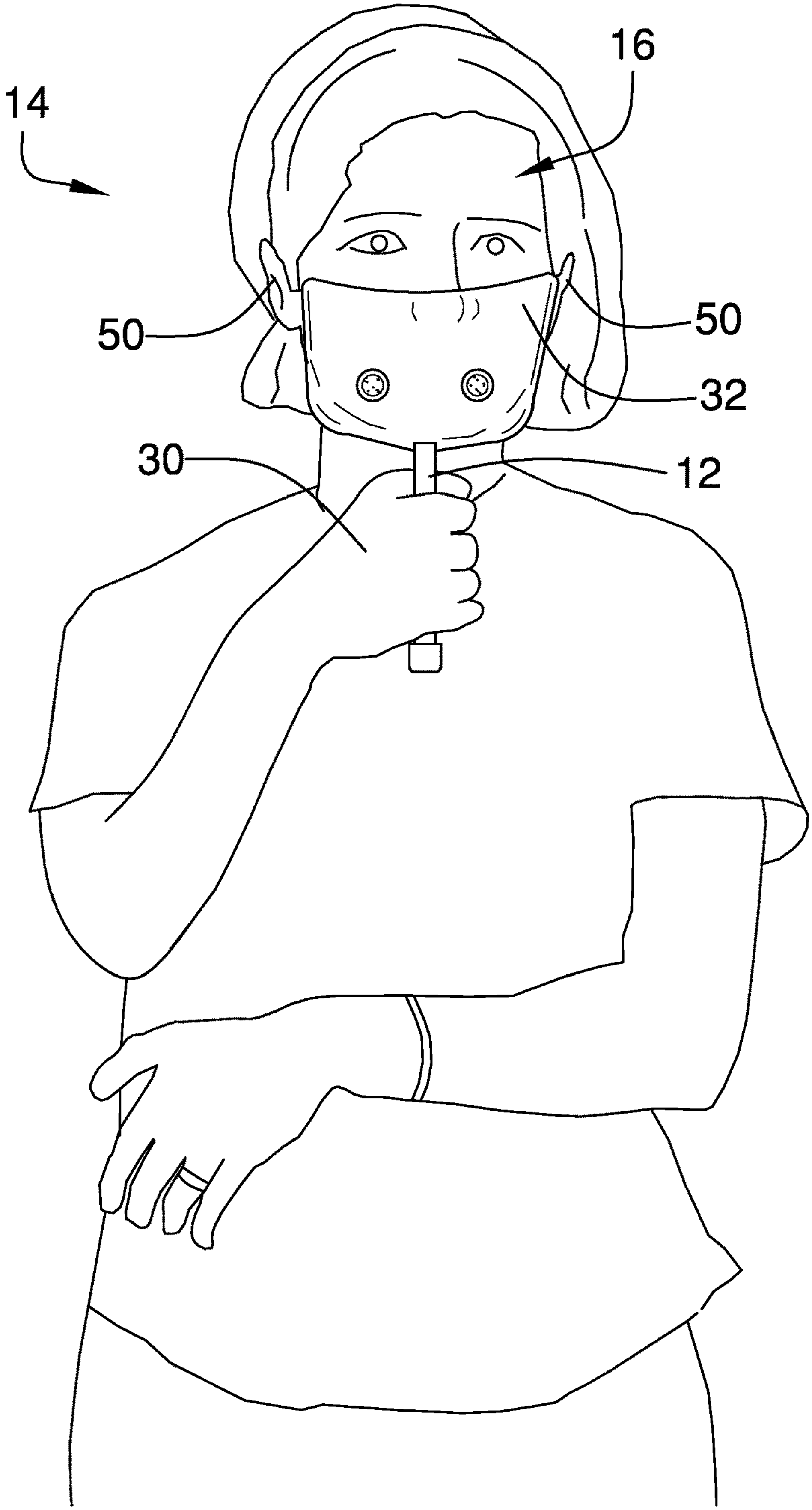
FIG. 6 is a perspective in-use view of an embodiment of the disclosure.

With reference now to the drawings, and in particular to FIGS. 1 through 6 thereof, a new facemask device embodying the principles and concepts of an embodiment of the disclosure and generally designated by the reference numeral 10 will be described.

As best illustrated in FIGS. 1 through 6, the hand held facemask assembly 10 generally comprises a handle 12 is configured to be gripped by a user 14. The handle 12 is longitudinally elongated such that the handle 12 can be directed toward the user's face 16 when the user 14 grips the handle 12. The handle 12 has a first end 18 and a second end 20, and the handle 12 is elongated between the first end 18 and the second end 20. Additionally, the second end 20 has a slot 22 extending toward the first end 18.

A knob 24 is coupled to the handle 12 to enhance the user's 14 ability to grip the handle 12. The knob 24 has a top side 26 and a bottom side 28, and the top side 26 is coupled to the first end 18 of the handle 12. The knob 24 has a diameter that is greater than a diameter of the handle 12 to inhibit the user's hand 30 from sliding downwardly off of the handle 12. A panel 32 is coupled to the handle 12 such that the panel 32 can be positioned in front of the user's face 16. The panel 32 has a pair of air holes 34 each extending therethrough for passing air therethrough thereby facilitating the user 14 to breathe through the air holes 34.

The panel 32 has a first surface 36, a second surface 38 and a perimeter edge 40 extending therebetween, and the perimeter edge 40 has a top side 42, a bottom side 44, a first lateral side 46 and a second lateral side 48. The bottom side 44 of the perimeter edge 40 is positioned in the slot 22 in the second end 20 of the handle 12 such that the panel 32 is coupled to the handle 12. In this way the first surface 36 can be directed toward the user's face 16. The handle 12 is centrally positioned between the first lateral side 46 and the second lateral side 48. Moreover, the first surface 36 is concavely arcuate between the first lateral side 46 and the second lateral side 48 to conform to curvature of the user's face 16 between the user's ears 50. The panel 32 may have a length of at least 10.0 inches and a width of at least 10.0 inches.

Each of the air holes 34 extends through the first surface 36 and the second surface 38. The air holes 34 are spaced apart from each other and are distributed along an axis extending between the first lateral side 46 and the second lateral side 48. Additionally, each of the air holes 34 is positioned closer to the bottom side 44 than the top side 42 of the perimeter edge 40, and each of the air holes 34 has a bounding edge 52. The panel 32 is comprised of a flexible material thereby facilitating the panel 32 to be shaped to precisely conform to contours of the user's face 16. Additionally, the panel 32 is comprised of a fluid impermeable material to inhibit water vapor from the user's 14 breath from passing therethrough. The first surface 36 has a recess 54 extending toward the second surface 38, and the recess 54 has a lower bounding surface 56 and a lateral bounding surface 58. The lateral bounding surface 58 is spaced from each of the top side 42, the bottom side 44, the first lateral side 46 and the second lateral side 48 of the perimeter edge 40 of the panel 32.

A pair of first rings 60 is provided and each of the first rings 60 has an outer surface 62. Each of the first rings 60 is positioned in a respective one of the air holes 34 to pass air therethrough. The outer surface 62 of each of the first rings 60 is coupled to the bounding edge 52 of the respective air hole 34 and each of the first rings 60 extends beyond the second surface 38 of the panel 32. Additionally, each of the first rings 60 has a distal surface 64 with respect to the second surface 38. A pair of second rings 66 is each coupled to the distal surface 64 of a respective one of the first rings 60 such that each of the second rings 66 is aligned with a respective one of the air holes 34. In this way each of the second rings 66 can pass air therethrough. Each of the second rings 66 extends away from the distal surface 64 of the respective first ring 60.

A filter 68 is coupled to the panel 32 such that the filter 68 can be directed toward the user's face 16. The filter 68 is comprised of an air permeable material to facilitate the user 14 to breathe through the filter 68. Additionally, the filter 68 is comprised of a bacterial blocking material to inhibit bacteria from passing therethrough. In this way the filter 68 inhibits airborne transmission of infectious diseases between the user 14 and an individual that is positioned proximate the user 14. The filter 68 may comprise an N95 filter or other filter approved by the Center for Disease Control for protecting against the transmission of Covid-19 and other viral diseases.

The filter 68 has a primary surface 70 and a secondary surface 72, and the filter 68 is positioned in the recess 54 in the first surface 36 of the panel 32 having the primary surface 70 abutting the bounding surface of the recess 54. Additionally, the filter 68 completely fills the recess 54. The filter 68 has a pair of protrusions 74 each extending away from the primary surface 70 of the filter 68 and each of the protrusions 74 extends through a respective one of the air holes 34. Moreover, each of the protrusions 74 extends through a respective one of the first rings 60 and a respective one of the second rings 66.

In use, the user 14 holds the handle 12 to position the panel 32 in front of the user's face 16. Additionally, the panel 32 can be shaped to conform to the user's face 16. In this way the user 14 can protect themselves against airborne transmission of infectious diseases such as Covid-19 or the like. Moreover, the panel 32 facilitates the user 14 to protect themselves and others around them without having to wear a face mask. In this way a professional in a beauty salon or a barber shop can provide service without the need to wear a face mask.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A hand held facemask assembly for filtering air breathed by a user thereby inhibiting airborne transmission of infectious diseases, said assembly comprising:

a handle being configured to be gripped by a user, said handle being longitudinally elongated wherein said handle is configured to be directed toward the user's face when the user grips said handle;

a knob being coupled to said handle wherein said knob is configured to enhance the user's ability to grip said handle;

a panel being coupled to said handle wherein said panel is configured to be positioned in front of the user's face, said panel having a pair of air holes each extending therethrough wherein each of said air holes is configured to pass air therethrough thereby facilitating the user to breathe through said air holes;

a filter being coupled to said panel wherein said filter is configured to be directed toward the user's face, said filter being comprised of an air permeable material wherein said filter is configured to facilitate the user to breathe through said filter, said filter being comprised of a bacterial blocking material wherein said filter is configured to inhibit bacteria from passing therethrough thereby inhibiting airborne transmission of infectious diseases between the user and an individual being positioned proximate the user;

wherein said handle has a first end and a second end, said handle being elongated between said first end and said second end, said second end having a slot extending toward said first end;

wherein said panel has a first surface, a second surface and a perimeter edge extending therebetween, said perimeter edge having a top side, a bottom side, a first lateral side and a second lateral side, said bottom side being positioned in said slot in said second end of said handle such that said panel is coupled to said handle wherein said first surface is configured to be directed toward the user's face, said handle being centrally positioned between said first lateral side and said second lateral side, said first surface being concavely arcuate between said first lateral side and said second lateral side wherein said first surface is configured to conform to curvature of the user's face between the user's ears;

a pair of first rings, each of said first rings having an outer surface, each of said first rings being positioned in a respective one of said air holes wherein each of said first rings is configured to pass air therethrough, said outer surface of each of said first rings being coupled to said bounding edge of said respective air hole, each of said first rings extending beyond said second surface of said panel, each of said first rings having a distal surface with respect to said second surface; and a pair of second rings, each of said second rings being coupled to said distal surface of a respective one of said first rings such that each of said second rings is aligned with a respective one of said air holes wherein each of said second rings is configured to pass air therethrough, each of said second rings extending away from said distal surface of said respective first ring.

2. The assembly according to claim 1, wherein said knob has a top side and a bottom side, said top side being coupled to said first end of said handle, said knob having a diameter being greater than a diameter of said handle wherein said knob is configured to inhibit the user's hand from sliding downwardly off of said handle.

3. The assembly according to claim 1, wherein each of said air holes extends through said first surface and said second surface, said air holes being spaced apart from each other and being distributed along an axis extending between said first lateral side and said second lateral side, each of said air holes being positioned closer to said bottom side than said top side, each of said air holes having a bounding edge.

4. The assembly according to claim 1, wherein said panel is comprised of a flexible material wherein said panel is configured to be shaped to precisely conform to contours of the user's face.

5. The assembly according to claim 1, wherein said panel is comprised of a fluid impermeable material wherein said panel is configured to inhibit water vapor from the user's breath from passing therethrough.

6. The assembly according to claim 1, wherein said first surface has a recess extending toward said second surface, said recess having a lower bounding surface and a lateral bounding surface, said lateral bounding surface being spaced from each of said top side, said bottom side, said first lateral side and said second lateral side of said perimeter edge of said panel.

7. The assembly according to claim 1, wherein:

said first surface of said panel has a recess extending toward said second surface, said recess having a lower bounding surface; and said filter has a primary surface and a secondary surface, said filter being positioned in said recess in said first surface of said panel having said primary surface abutting said bounding surface of said recess, said filter completely filling said recess, said filter having a pair of protrusions each extending away from said primary surface of said filter, each of said protrusions extending through a respective one of said air holes, each of said protrusions extending through a respective one of said first rings and a respective one of said second rings.

8. A hand held facemask assembly for filtering air breathed by a user thereby inhibiting airborne transmission of infectious diseases, said assembly comprising:

a handle being configured to be gripped by a user, said handle being longitudinally elongated wherein said handle is configured to be directed toward the user's face when the user grips said handle, said handle having a first end and a second end, said handle being elongated between said first end and said second end, said second end having a slot extending toward said first end;

a knob being coupled to said handle wherein said knob is configured to enhance the user's ability to grip said handle, said knob having a top side and a bottom side, said top side being coupled to said first end of said handle, said knob having a diameter being greater than a diameter of said handle wherein said knob is configured to inhibit the user's hand from sliding downwardly off of said handle;

a panel being coupled to said handle wherein said panel is configured to be positioned in front of the user's face, said panel having a pair of air holes each extending therethrough wherein each of said air holes is configured to pass air therethrough thereby facilitating the user to breathe through said air holes, said panel having a first surface, a second surface and a perimeter edge extending therebetween, said perimeter edge having a top side, a bottom side, a first lateral side and a second lateral side, said bottom side being positioned in said slot in said second end of said handle such that said panel is coupled to said handle wherein said first surface is configured to be directed toward the user's face, said handle being centrally positioned between said first lateral side and said second lateral side, said first surface being concavely arcuate between said first lateral side and said second lateral side wherein said first surface is configured to conform to curvature of the user's face between the user's ears, each of said air holes extending through said first surface and said second surface, said air holes being spaced apart from each other and being distributed along an axis extending between said first lateral side and said second lateral side, each of said air holes being positioned closer to said bottom side than said top side, each of said air holes having a bounding edge, said panel being comprised of a flexible material wherein said panel is configured to be shaped to precisely conform to contours of the user's face, said panel being comprised of a fluid impermeable material wherein said panel is configured to inhibit water vapor from the user's breath from passing therethrough, said first surface having a recess extending toward said second surface, said recess having a lower bounding surface and a lateral bounding surface, said lateral bounding surface being spaced from each of said top side, said bottom side, said first lateral side and said second lateral side of said perimeter edge of said panel;

a pair of first rings, each of said first rings having an outer surface, each of said first rings being positioned in a respective one of said air holes wherein each of said first rings is configured to pass air therethrough, said outer surface of each of said first rings being coupled to said bounding edge of said respective air hole, each of said first rings extending beyond said second surface of said panel, each of said first rings having a distal surface with respect to said second surface;

a pair of second rings, each of said second rings being coupled to said distal surface of a respective one of said first rings such that each of said second rings is aligned with a respective one of said air holes wherein each of said second rings is configured to pass air therethrough, each of said second rings extending away from said distal surface of said respective first ring; and a filter being coupled to said panel wherein said filter is configured to be directed toward the user's face, said filter being comprised of an air permeable material wherein said filter is configured to facilitate the user to breathe through said filter, said filter being comprised of a bacterial blocking material wherein said filter is configured to inhibit bacteria from passing therethrough thereby inhibiting airborne transmission of infectious diseases between the user and an individual being positioned proximate the user, said filter having a primary surface and a secondary surface, said filter being positioned in said recess in said first surface of said panel having said primary surface abutting said bounding surface of said recess, said filter completely filling said recess, said filter having a pair of protrusions each extending away from said primary surface of said filter, each of said protrusions extending through a respective one of said air holes, each of said protrusions extending through a respective one of said first rings and a respective one of said second rings.

* * * * *